(12) United States Patent
Ning et al.

(10) Patent No.: US 11,585,315 B2
(45) Date of Patent: Feb. 21, 2023

(54) OFFSHORE OSCILLATING WATER COLUMN WAVE ENERGY CONVERSION DEVICE WITH EXTERNAL PERMEABLE STRUCTURE

(71) Applicant: Dalian University of Technology, Dalian (CN)

(72) Inventors: Dezhi Ning, Dalian (CN); Xiangyu Zhang, Dalian (CN); Yili Wang, Dalian (CN); Rongquan Wang, Dalian (CN); Mengzhao Cheng, Dalian (CN); Yaohua He, Dalian (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 17/504,287

(22) Filed: Oct. 18, 2021

(65) Prior Publication Data
US 2022/0162986 A1 May 26, 2022

(30) Foreign Application Priority Data
Nov. 20, 2020 (CN) .......................... 202011316682.9

(51) Int. Cl.
*F03B 13/14* (2006.01)
*F03B 17/00* (2006.01)
(52) U.S. Cl.
CPC ............ *F03B 13/142* (2013.01); *F03B 13/14* (2013.01); *F03B 17/00* (2013.01)
(58) Field of Classification Search
CPC ........ F03B 13/142; F03B 13/14; F03B 17/00; F03B 13/24; F05B 2240/95; F05B 2250/191; F05B 2250/711; F05B 2250/72; Y02E 10/20; Y02E 10/30; B63B 21/20; F01D 15/10
USPC .................................................... 60/497–499
See application file for complete search history.

(56) References Cited

U.S. PATENT DOCUMENTS

| | | | | |
|---|---|---|---|---|
| 4,271,668 A * | 6/1981 | McCormick | .......... | F03B 13/142 415/908 |
| 4,326,840 A * | 4/1982 | Hicks | ..................... | B01D 61/10 417/469 |
| 5,842,838 A * | 12/1998 | Berg | ................... | F03B 13/1875 60/505 |
| 8,745,981 B1 * | 6/2014 | Hanna | ................. | F03B 13/1855 60/507 |

(Continued)

*Primary Examiner* — Hoang M Nguyen
(74) *Attorney, Agent, or Firm* — Nitin Kaushik

(57) ABSTRACT

The present disclosure belongs to the technical field of new energy utilization, and provides an offshore oscillating water column wave energy conversion device with an external permeable structure. The offshore oscillating water column wave energy conversion device with the external permeable structure comprises an oscillating water column system, an anchoring fixing system and a permeable structure. According to the offshore oscillating water column wave energy conversion device with the external permeable structure provided by the present disclosure, the offshore oscillating water column wave energy conversion device and the permeable structure are effectively combined. Using an offshore floating structure, the offshore oscillating water column wave energy conversion device with the external permeable structure can be applied to deep and far sea areas with higher wave energy density, and the output power of the device can be effectively improved.

1 Claim, 2 Drawing Sheets

(56) References Cited

U.S. PATENT DOCUMENTS

2019/0353139 A1* 11/2019 Sheldon-Coulson ........................ F03B 13/142

* cited by examiner

OFFSHORE OSCILLATING WATER COLUMN WAVE ENERGY CONVERSION DEVICE WITH EXTERNAL PERMEABLE STRUCTURE

CROSS REFERENCE TO RELATED APPLICATION(S)

This patent application claims the benefit and priority of Chinese Patent Application No. 202011316682.9, filed on Nov. 20, 2020, the disclosure of which is incorporated by reference herein in its entirety as part of the present application.

TECHNICAL FIELD

The present disclosure relates to an offshore oscillating water column wave energy conversion device with an external permeable structure, and belongs to the technical field of new energy utilization.

BACKGROUND ART

With the development of social economy, the global demand for energy is increasing day by day, while the traditional non-renewable fossil fuels such as coal, oil and natural gas is decreasing day by day. At the same time, the pollutants discharged by consuming fossil fuels have caused great pollution to the environment. Therefore, the development and utilization of renewable energy has become the focus of attention of all countries in the world. The ocean contains huge energy, among which wave energy is a very important renewable energy. Up to now, people have invented various wave energy conversion devices to extract energy from waves, in which the oscillating water column wave energy conversion device has become one of the most widely studied and applied wave energy devices device in the world due to its mechanical and structural simplicity.

The efficiency of wave energy conversion device is low due to the low density of wave energy flow in nearshore shallow water area, which is not conducive to the large-scale development of wave energy and brings limited economic benefits. Therefore, at present, countries around the world have shifted their research and development focus to offshore wave energy conversion devices. The oscillating water column wave energy device mainly consists of an air chamber with an opening at the bottom, a bidirectional air turbine at the top and a generator. During operation, the water column in the air chamber vibrates up and down under the action of waves, forcing the air in the air chamber to generate reciprocating airflow at the vent, driving the air turbine to rotate, and further driving the generator to generate electricity.

Due to the complexity of the working environment of wave energy devices and the increasing frequent occurrence of extreme sea conditions, accidents of wave energy conversion devices damaged by waves frequently occur in recent years, and the survivability of the devices is facing great challenges. The water column in the chamber of the oscillating water column wave energy device mainly has two kinds of motion, piston and sloshing, and the energy conversion of the device is mainly contributed by the piston motion of the oscillating water column. The water column in the device mainly produces piston motion under the action of long wave. Under the action of shortwave, most of wave energy is reflected by the air chamber due to the weak transmission ability of short wave, resulting in low energy conversion efficiency and large wave load of the device. The permeable structure has a good effect of wave elimination, and is widely used in ocean engineering structures that need wave elimination. Therefore, the present disclosure proposes to add the permeable structure around the device to weaken the damage effect of short wave on the device, so as to improve the survivability of the device.

SUMMARY

Aiming at the defects of the prior art, the purpose of the present disclosure is to design an offshore oscillating water column wave energy conversion device with an external permeable structure under the condition of ensuring higher energy conversion efficiency of the wave energy device. Using the permeable structure has little influence on the hydrodynamic performance of the device under the action of long wave, (the target working sea conditions), but can effectively reduce the wave load on the device under the action of short wave (non-target working sea conditions). Thereby improving the survivability of the device on the premise of ensuring the energy conversion efficiency of the device.

According to the technical scheme of the present disclosure, there is provided with:

an offshore oscillating water column wave energy conversion device with an external permeable structure, comprising an oscillating water column system, an anchoring fixing system and a permeable structure;

wherein the oscillating water column system mainly consists of an air chamber 6, an inner cylinder 1 and a turbine power generation system 4;

the air chamber 6 is a cavity consisting of an outer cylindrical ring body 2 and a hemispherical ring body 3, the hemispherical ring body 3 is buckled on the outer cylindrical ring body 2 upside down, and the lower end of the hemispherical ring body is attached to the outer cylindrical ring body 2 with the same radius; the outer cylindrical ring body 2 is a hollow cylinder with open top and bottom ends, and the hemispherical ring body 3 is a hollow hemisphere; a vent channel 9 is provided at the center of the top end of the hemispherical ring body 3, and a turbine power generation system 4 is provided in the vent channel 9; the turbine power generation system 4 consists of an air turbine and a generator, and the air turbine is connected with the generator;

the inner cylinder 1 is located on the axis of the air chamber 6, and the top end of the inner cylinder is connected with the bottom end of a supporting frustum 5; the top end of the supporting frustum 5 is connected to the hemispherical ring body 3 and is attached to the inner surface of the hemispherical ring body 3; a cylindrical vent penetrating through the frustum is provided inside the supporting frustum 5, and a vent channel 9 is provided at the top center of the supporting frustum 5 and communicated with the vent of the hemispherical ring body 3;

the anchoring fixing system consists of a plurality of anchor chains 8, one end of each anchor chain 8 is connected with the bottom edge of the inner cylinder 1, and the other end thereof is fixed on the seabed;

the permeable structure 7 is a hollow cylinder with open top and bottom ends, a plurality of cylindrical holes are distributed on the surface, and the inner surface of the permeable structure 7 is attached to the outer surface of the outer cylindrical ring body 2.

The present disclosure has the beneficial effects that according to the present disclosure, the offshore oscillating water column wave energy conversion device and the permeable structure are effectively combined. Using an offshore floating structure, the offshore oscillating water column wave energy conversion device with the external permeable structure can be applied to deep and far sea areas with higher wave energy density, and the output power of the device can be effectively improved; by using the permeable structure, the target sea condition, i.e., long wave, transmission into an air chamber is not affected, while the large wave loads generated by short waves to the device can be effectively reduced. As a result, the oscillating water column wave energy conversion device can be ensured to efficiently and stably operate for a long time.

Reference signs in drawings: 1 inner cylinder; 2 outer cylindrical ring body; 3 hemispheric ring body; 4 turbine power generation system; 5 supporting frustum; 6 air chamber; 7 permeable structure; 8 anchor chain; 9 vent channel.

DETAILED DESCRIPTION OF THE EMBODIMENTS

Hereinafter, the specific embodiments of the present disclosure will be further explained with reference to the drawings and technical solutions.

Figure 1:
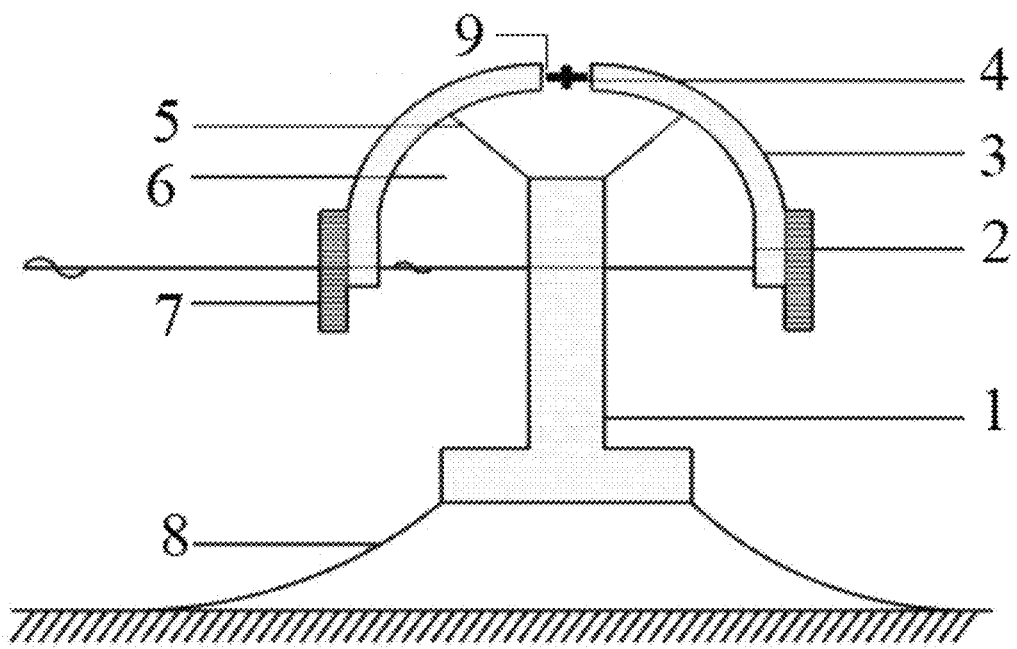
FIG. 1 is a structural schematic diagram of an offshore oscillating water column wave energy conversion device with an external permeable structure.
Figure 2:
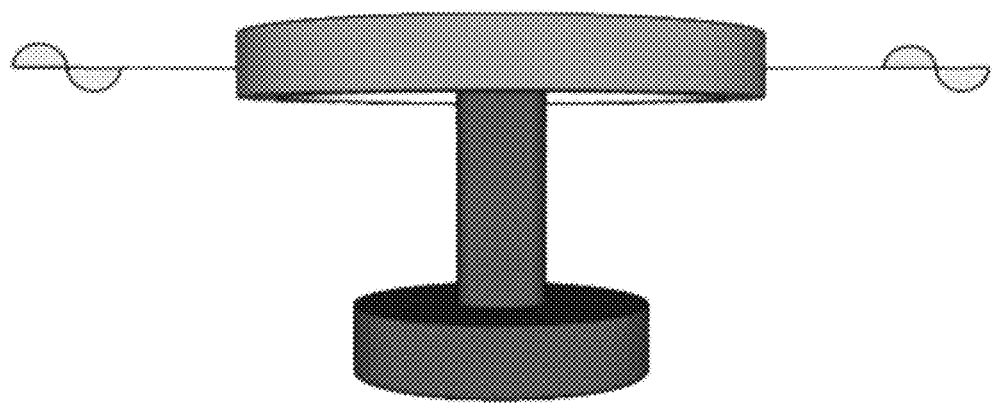
FIG. 2 is a structural schematic diagram of an inner cylinder and an outer cylinder ring body.
Figure 3:
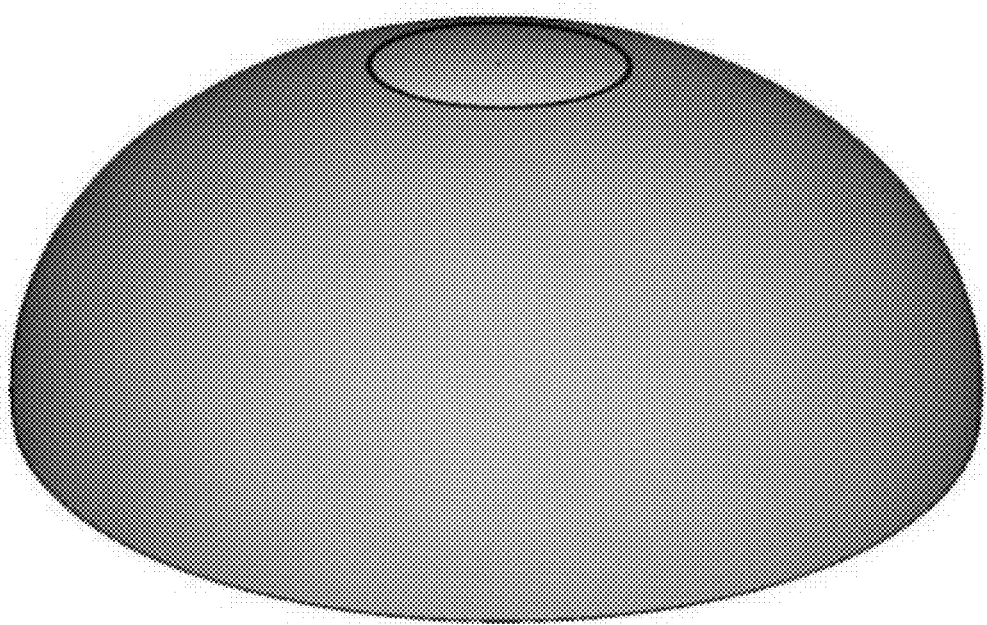
FIG. 3 is a structural schematic diagram of a hemispherical ring body.
Figure 4:
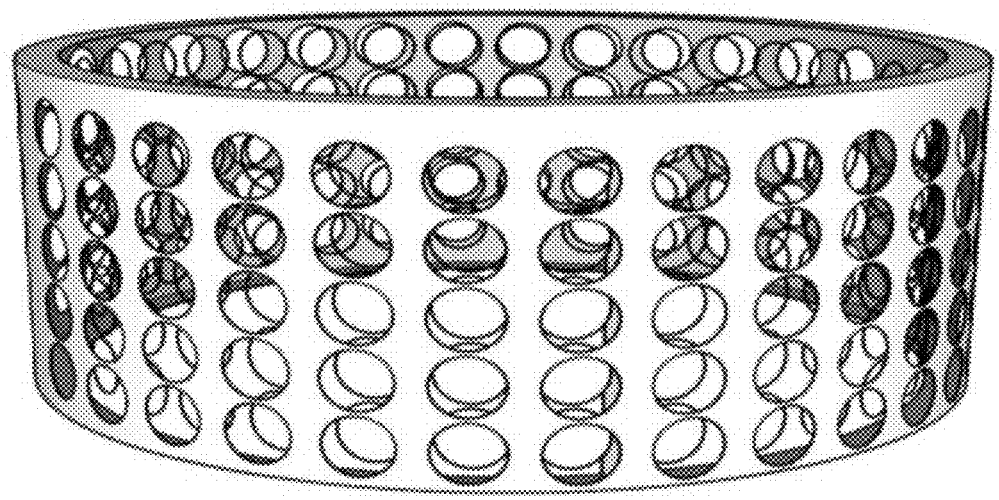
FIG. 4 is a structural schematic diagram of a permeable structure.
Figure 5:
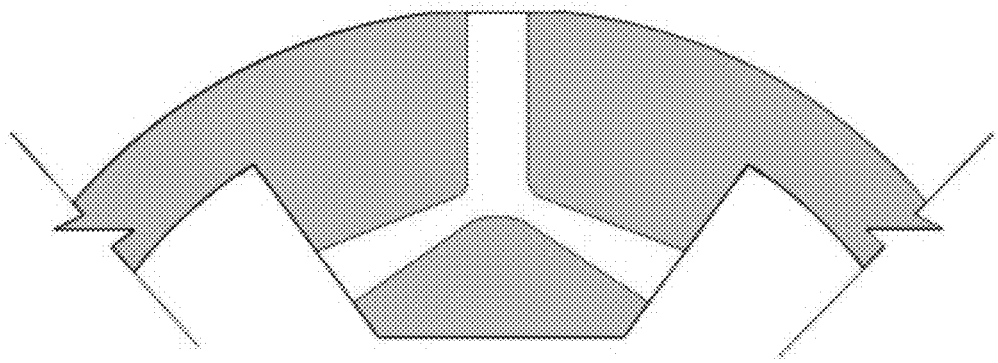
FIG. 5 is a schematic sectional view of a supporting frustum.

As shown in FIG. 1, an offshore oscillating water column wave energy conversion device with a permeable structure comprises an oscillating water column system, an anchoring fixing system and a permeable structure. The oscillating water column system mainly consists of an air chamber 6, an inner cylinder 1 and a turbine power generation system 4. The anchoring fixing system consists of a plurality of anchor chains 8. The permeable structure 7 is on the outermost side.

For the oscillating water column system, the air chamber 6 consists of an outer cylindrical ring body 2 and a hemispherical ring body 3, and the hemispherical ring body 3 is located on the outer cylindrical ring body 2 with the same radius. A vent channel 9 is provided at the center of the top end of the hemispherical ring body 3. A turbine power generation system 4 rotating in the same direction under the action of bidirectional airflow is provided in the vent channel 9. As a floating body, the inner cylinder 1 provides buoyancy for the whole system, and its top end is connected with the supporting frustum 5 to enclose an air chamber with the outer cylindrical ring body 2. A cylindrical vent is provided inside the supporting frustum 5, so that air flow enters the vent.

In use, the device floats on the water surface, and under the action of sea waves, the waves enter into the outer cylindrical ring body 2. The water column in the outer cylindrical ring body 2 oscillates up and down under the action of waves, forcing the air inside the air chamber to expand and compress, forming an air flow which enters the vent channel 9 in the middle of the top of the hemispherical ring body 3 through the cylindrical vent of the supporting frustum 5, and pushing the turbine generator 4 to rotate to generate electricity. The outermost permeable structure 7 protects the outer cylindrical ring body 2 from being damaged by waves when the device works and resulting in failure of the device.

A cylindrical vent is provided at the top of the air chamber 6, and air flow enters the vent through the hemispherical ring body 3, so that resistance can be reduced, air flow speed can be increased, and power generation efficiency can be improved.

The turbine power generation system 4 can rotate under the action of bidirectional airflow, and the air chamber can generate electricity in the two processes of suction and exhaust.

The inner cylinder 1 is located on the axis, which can reduce the sloshing of the water surface inside the air chamber.

The permeable structure 7 can effectively reduce the impact damage of short wave on the device, protect the safety of the device and improve its survivability.

In addition to the above embodiments, the present disclosure can have other embodiments. All technical schemes formed by equivalent substitution or equivalent transformation fall within the scope of protection claimed by the present disclosure.

What is claimed is:
1. An offshore oscillating water column wave energy conversion device with an external permeable structure, comprising an oscillating water column system, an anchoring fixing system and a permeable structure;
wherein the oscillating water column system comprises an air chamber (6), an inner cylinder (1) and a turbine power generation system (4);
the air chamber (6) is a cavity comprising an outer cylindrical ring body (2) and a hemispherical ring body (3), the hemispherical ring body (3) is buckled on the outer cylindrical ring body (2) upside down, and the lower end of the hemispherical ring body is attached to the outer cylindrical ring body (2) with the same radius; the outer cylindrical ring body (2) is a hollow cylinder with open top and bottom ends, and the hemispherical ring body (3) is a hollow hemisphere; a vent channel (9) is provided at the center of the top end of the hemispherical ring body (3), and the turbine power generation system (4) is provided in the vent channel (9); the turbine power generation system (4) comprises an air turbine and a generator, and the air turbine is connected with the generator;
the inner cylinder (1) is located on the axis of the air chamber (6), and the top end of the inner cylinder is connected with the bottom end of a supporting frustum (5); the top end of the supporting frustum (5) is connected to the hemispherical ring body (3) and is attached to the inner surface of the hemispherical ring body (3); a cylindrical vent penetrating through the frustum is provided inside the supporting frustum (5), and a vent channel (9) is provided at the top center of the supporting frustum (5) and communicated with the vent of the hemispherical ring body (3);
the anchoring fixing system comprises a plurality of anchor chains (8), one end of each anchor chain (8) is connected with the bottom edge of the inner cylinder (1), and the other end thereof is fixed on the seabed;
the permeable structure (7) is a hollow cylinder with open top and bottom ends, a plurality of cylindrical holes are distributed on the surface, and the inner surface of the permeable structure (7) is attached to the outer surface of the outer cylindrical ring body (2).

\* \* \* \* \*